United States Patent
Soni et al.

(10) Patent No.: US 12,373,594 B2
(45) Date of Patent: Jul. 29, 2025

(54) ACCESS PROVISIONING FRAMEWORK WITH CELL-LEVEL SECURITY CONTROL

(71) Applicant: Microsoft Technology Licensing, LLC, Redmond, WA (US)

(72) Inventors: Saurabh Soni, Telangana (IN); Himanshu Ratilal Gohel, Telangana (IN); Ashok Nair, Telangana (IN); Kalpana Chauhan, Madhya Pradesh (IN); Saurabh Singh, Uttar Pradesh (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 140 days.

(21) Appl. No.: 18/328,241

(22) Filed: Jun. 2, 2023

(65) Prior Publication Data
US 2024/0403474 A1    Dec. 5, 2024

(51) Int. Cl.
G06F 21/62    (2013.01)
G06F 21/60    (2013.01)

(52) U.S. Cl.
CPC ........ *G06F 21/6227* (2013.01); *G06F 21/606* (2013.01); *G06F 21/6245* (2013.01)

(58) Field of Classification Search
CPC ............... G06F 21/6227; G06F 21/606; G06F 21/6245; G06F 16/24539; G06F 16/24547
See application file for complete search history.

(56) References Cited

U.S. PATENT DOCUMENTS

| | | | | |
|---|---|---|---|---|
| 2004/0073443 | A1* | 4/2004 | Gabrick | G06Q 50/184 |
| | | | | 705/310 |
| 2007/0244899 | A1* | 10/2007 | Faitelson | G06F 21/6218 |
| | | | | 707/999.009 |
| 2011/0106802 | A1* | 5/2011 | Pinkney | G06F 16/184 |
| | | | | 707/E17.054 |
| 2016/0162702 | A1* | 6/2016 | Tholfsen | G06F 21/6218 |
| | | | | 726/4 |
| 2017/0140171 | A1* | 5/2017 | Antonelli | G06F 21/6272 |
| 2017/0185766 | A1* | 6/2017 | Narendra Trivedi | |
| | | | | G06F 21/606 |
| 2021/0234869 | A1* | 7/2021 | Bondugula | H04L 63/0254 |
| 2021/0286894 | A1* | 9/2021 | Avanes | G06F 16/248 |
| 2021/0400071 | A1* | 12/2021 | Ray | H04L 63/1441 |
| 2022/0374532 | A1 | 11/2022 | Zaharia | |
| 2023/0222121 | A1* | 7/2023 | Ganesh | G06F 16/285 |
| | | | | 707/609 |

(Continued)

FOREIGN PATENT DOCUMENTS

CN    113704821 A    11/2021

OTHER PUBLICATIONS

International Search Report and Written Opinion received for PCT Application No. PCT/US2024/030666, Aug. 9, 2024, 12 pages.

*Primary Examiner* — John B King
(74) *Attorney, Agent, or Firm* — ArentFox Schiff LLP

(57) ABSTRACT

Example aspects include techniques for provisioning downstream access to requested data within a data lake with cell-level granularity. These techniques include receiving a request for downstream access to filtered data from a data lake, generating a logical view to the data lake based on the request, the logical view restricted to the filtered data, and generating a temporary storage location for storing retrieved data received from the data lake via the logical view. The techniques also include assigning a compute cluster to the logical view, and accessing, via the logical view, by the compute cluster, the filtered data including storing the filtered data within the temporary storage location.

20 Claims, 4 Drawing Sheets

(56) References Cited

U.S. PATENT DOCUMENTS

2024/0119169 A1\* 4/2024 Sethi ..................... G06F 3/0486

\* cited by examiner

ACCESS PROVISIONING FRAMEWORK WITH CELL-LEVEL SECURITY CONTROL

BACKGROUND

Most applications incorporate a data layer for storing information and providing the information to users and/or services. For example, many applications include database management systems for data persistence. Access to database management systems has traditionally been achieved by assigning one or more access privileges to users. As an example, a big data platform may employ file level security techniques where access is granted on a file level. In particular, a user, a process, or an application may access a file based on the privileges granted to the user, the process, or the application. However, modern data-engineering requirements have placed a greater importance on data security, but often provide overprivileged permissions that may lead to unauthorized data access.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In some aspects, the techniques described herein relate to a device including: a memory storing instructions; and at least one processor coupled with the memory and configured to execute the instructions to: receive a request for downstream access to filtered data from a data lake; generate a logical view to the data lake based on the request, the logical view restricted to the filtered data; generate a temporary storage location for storing retrieved data received from the data lake via the logical view; assign a compute cluster to the logical view; generate, based on the request, a user group for a downstream organization, the user group providing read-only access to the temporary storage location; and access, via the logical view, by the compute cluster, the filtered data and store the filtered data within the temporary storage location.

In some aspects, the techniques described herein relate to a method including: receiving a request for downstream access to filtered data from a data lake; generating a logical view to the data lake based on the request, the logical view restricted to the filtered data; generating a temporary storage location for storing retrieved data received from the data lake via the logical view; assigning a compute cluster to the logical view; generating, based on the request, a user group for a downstream organization, the user group providing read-only access to the temporary storage location; and accessing, via the logical view, by the compute cluster, the filtered data and storing the filtered data within the temporary storage location.

In some aspects, the techniques described herein relate to a non-transitory computer-readable device having instructions thereon that, when executed by at least one computing device, causes the at least one computing device to perform operations including: receiving a request for downstream access to filtered data from a data lake; generating a logical view to the data lake based on the request, the logical view restricted to the filtered data; generating a temporary storage location for storing retrieved data received from the data lake via the logical view; assigning a compute cluster to the logical view; generating, based on the request, a user group for a downstream organization, the user group providing read-only access to the temporary storage location; and accessing, via the logical view, by the compute cluster, the filtered data and storing the filtered data within the temporary storage location.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for implementing an access provisioning framework with cell-level security control. With the increase in data engineering applications, data is now a critical strategic asset that should be securely shared with customers and partners. For example, some business intelligence applications require high granularity. However, in a decoupled storage-compute architecture and with storage providing only file level security controls, enabling this level of security via storage only techniques produce inefficient solutions.

Aspects of the present disclosure provision downstream access to requested data within a data store with cell-level granularity. In particular, e.g., a cloud computing system generates a restricted view for accessing a limited set of data of a data lake based on a downstream request, reduces usage of the view to a specific cluster, and limits job execution via the cluster to a particular group of identities identified within the request. Accordingly, the present techniques inherently provide least privilege access at a cell level granularity within decoupled storage-compute architecture.

In particular, based on a role of a user, a computing system maps the user to one or more data usage scenarios and column(s) accessible by the data usage scenarios as defined by a data policy. Further, the computing system stores row level and column level security access permissions within a database, and dynamically updates the row level and column level security access permissions in response to changes within the computing system. Accordingly, the present techniques inherently provide least privilege access at a column level granularity, while reducing access leakage due to outdated access control information.

Illustrative Environment

Figure 1:
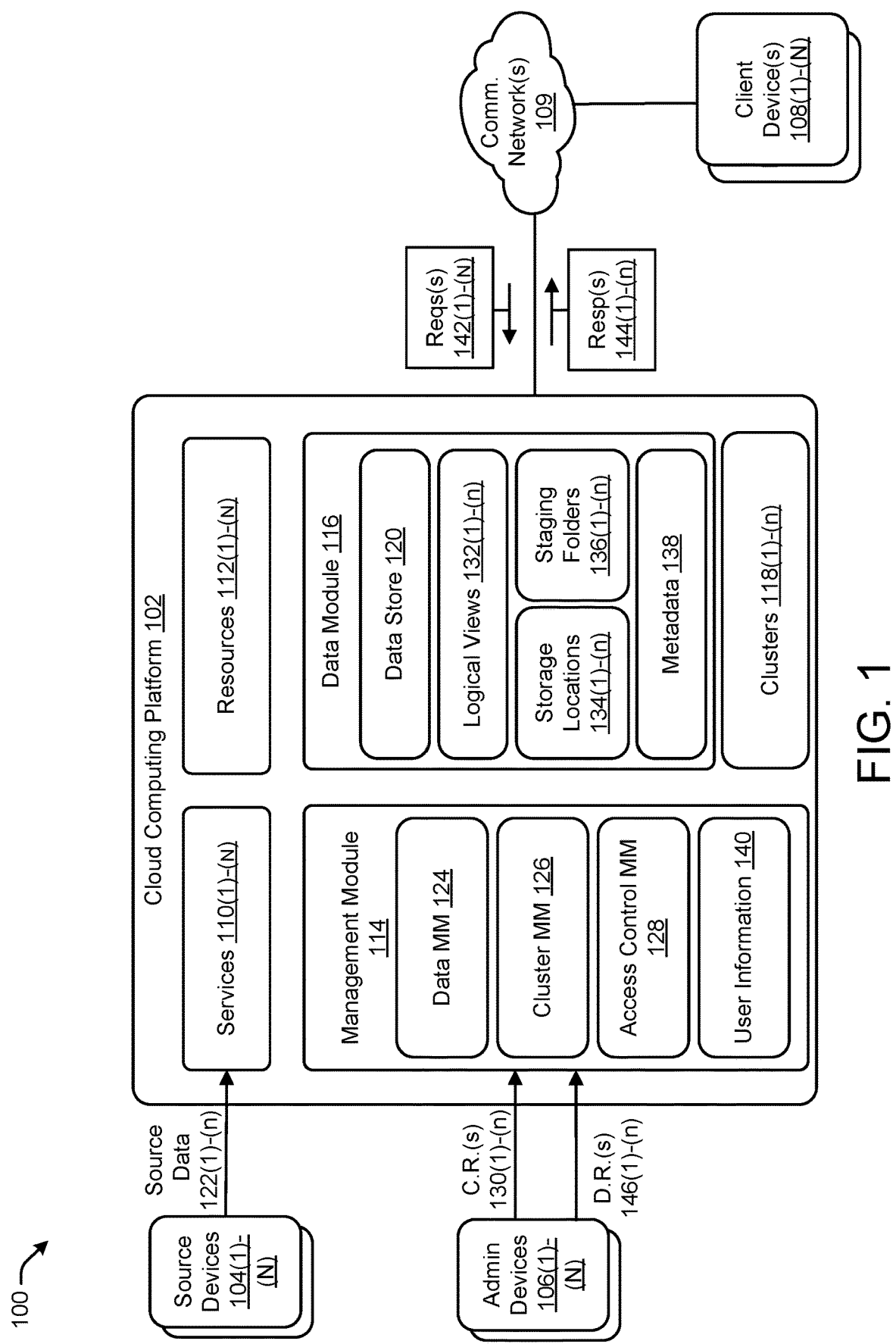
FIG. 1 is a diagram showing an example of a cloud computing system, in accordance with some aspects of the present disclosure.

FIG. 1 is a diagram showing an example of a cloud computing system 100, in accordance with some aspects of the present disclosure.

As illustrated in FIG. 1, the cloud computing system 100 includes a cloud computing platform 102, a plurality of source devices 104(1)-(n), a plurality of administrator devices 106(1)-(n), and a plurality of client devices 108(1)-(n). The cloud computing platform 102 may provide the source devices 104(1)-(n) and the client devices 108(1)-(n) with distributed storage and access to software, services, files, and/or data via a communications network 109, e.g., the Internet, intranet, etc. Some examples of the source devices 104(1)-(n), the administrator devices 106(1)-(n), and the client devices 108(1)-(n) include smartphone devices and computing devices, Internet of Things (IoT) devices, drones, robots, process automation equipment, sensors, control devices, vehicles, transportation equipment, tactile interaction equipment, virtual and augmented reality (VR and AR) devices, industrial machines, etc. Further, in some aspects, the source devices 104(1)-(n), the administrator devices 106(1)-(n), and the client devices 108(1)-(n) include one or more applications configured to interface with the cloud computing platform 102.

In some aspects, the cloud computing platform is a multi-tenant environment that provides the client devices 108(1)-(n) with distributed storage and access to software, services, files, and/or data via the one or more network(s) 109(1)-(n). In a multi-tenant environment, one or more system resources of the cloud computing platform 102 are shared among tenants but individual data associated with each tenant is logically separated. As illustrated in FIG. 1, the cloud computing platform 102 may further include a plurality of services 110(1)-(n) and a plurality of resources 112(1)-(n). Some examples of a service 110 include infrastructure as a service (IaaS), platform as a service (PaaS), software as a service (SaaS), database as a service (DaaS), security as a service (SECaaS, big data as a service (BDaaS), a monitoring as a service (MaaS), logging as a service (LaaS), internet of things as a service (IOTaaS), identity as a service (IDaaS), analytics as a service (AaaS), function as a service (FaaS), and/or coding as a service (CaaS). Some examples of the resources 110(1)-(n) may include computing units, bandwidth, data storage, application gateways, software load balancers, memory, field programmable gate arrays (FPGAs), graphics processing units (GPUs), input-output (I/O) throughput, or data/instruction cache.

Further, the cloud computing platform 102 may include a management module 114, a data module 116, and one or more clusters 118. As described herein, in some aspects, the data module 116 may store data resulting from activity by the source devices 104(1)-(n) and/or the services 110(1)-(n) within a data store 120 of the data module 116. In some aspects, the data store 120 includes one or more data lakes. As used herein, in some aspects, a "data lake" refers a single, centralized repository that stores both structured and unstructured data. In some aspects, a data lake enables the client devices 108(1)-(n) to quickly and easily store and access a wide variety of data in a single location. In some aspects, the data lake stores data in its raw or native format, usually as files or as binary large objects (blobs). In some aspects, the data lake includes database objects. For example, a database object may include a database table that organizes data in columns and rows. Each row represents a unique record, and each column represents a field within the record. For example, a table of contact addresses may include a row for each person and attributes (i.e., columns) for first name, last name, street address, city, state, and/or zip code. Further, the data module 116 receives requests for data stored within the data store 120, and transmits responses including data stored within the data store 120 in response to the requests. In some aspects, a "cluster" in a cloud computing environment may refer to a group of interconnected servers or virtual machines that work together to perform tasks and provide resources as a single, cohesive unit.

Further, in some aspects, the client devices 108 employ the services 110 to analyze the data of the data store 120. As an example, in some aspects, the client devices 108 perform business intelligence operations, big data operations, and/or analytic operations over the data store 120 using the one or more services 110. In particular, in some aspects, the business intelligence operations, big data operations, and/or analytic operations are performed over source data 122 received from the source devices 104(1)-(n) and/or source data 122 generated in response to activity performed by the source devices 104(1)-(n).

The management module 114 implements an access provisioning framework that automates data access with row and column level security over data modules 116 typically configured to employ file level access. As illustrated in FIG. 1, the management module 114 includes a data management module (MM) 124, a cluster management module (MM) 126, and an access control management module (MM) 128. The data management module 124 configures secure access to entities within the data store 120. For example, the management module 114 receives a configuration request 130 from an administrator devices 106 for downstream access by one or more client devices 108 to data within the data store 120. In some aspects, the configuration request 130 identifies the requested entities to be accessed within the data store 120 and the one or more identities (e.g., user accounts, jobs, applications, and/or client devices 108) that will receive access to the entities. Further, in some aspects, the configuration request 130 is generated via a graphical user interface (GUI) provided by the cloud computing platform 102 to the administrator device 104.

In response, the data management module 124 generates logical views 132(1)-(n) for limited access to the requested data. In some aspects, the logical view 132 provides cell-level access to the requested data. Further, the cell-level access is implemented via table access control, cluster access control, cluster visibility control, and/or job access control. For example, in some aspects, the data management module 124 provides row-level security via one or more filter operations defined to limit the rows provided via the view and provides column-level security via the requested attributes of the requested data to achieve cell-level access. In addition, the data management module 124 creates a temporary storage location 134 for storing data retrieved via the logical view 132 and a staging folder 136 for storing query scripts (e.g., SQL scripts) employed during jobs over the logical view 132. As another example, in some aspects, the data access of members of the user group is configured so that the members are only able to access a cluster 118 and/or have visibility to a cluster 118 corresponding to a logical view 132 limited to one or more particular cells. For example, the requested data is stored within the temporary storage location 134, and accessed by the one or more client devices 108 downstream from the temporary storage location 134. Additionally, the data management module 124 manages metadata 138 corresponding to the data store 120. For example, the data management module 124 tracks the details of the entities of the data store 120 and generates the metadata 138 reflecting the details of the entities of the data store 120.

The cluster management module 126 generates and/or assigns the one or more clusters 118(1)-(*n*). As used herein, in some aspects, a "cluster" (compute cluster) refers to a set of computation resources and configurations on which run data engineering, data science, and data analytics workloads, such as production ETL pipelines, streaming analytics, ad-hoc analytics, and machine learning. Further, as described herein, each cluster 118 is assigned to a logical view 132. In particular, each cluster 118 is limited to accessing a single logical view 132 generated by the data management module 124, and writes the data of the logical view 132 to the temporary storage location 134 associated with the logical view 132.

In some aspects, the cluster management module 126 determines the type of cluster 118 to generate for a logical view 132 based on one or more characteristics of the requested data associated with the view 132 within the configuration request 130. For example, the cluster management module 126 identifies the size of the entities associated with the configuration request 130 within the metadata 138, determines a static weight for each entity based upon the size of the entity, sums the static weights to determine to the total weight value of the entities, calculates the request complexity based on the total weight value (e.g., multiply the total weight value by a complexity multiplier), and compares to the request complexity to one or more predefined threshold values to determine the type of cluster to generate for a configuration request 130. Once the cluster type is determined, the cluster management module 126 assigns the cluster 118 to the view generated for a configuration request 130. Further, in some aspects, the cluster management module 126 reconfigures the assigned cluster 118 or reassigns the logical view 132 to a new cluster 188 in response to recalculating the request complexity in response to changes in the size of the corresponding entities and the recalculated request complexity being greater than or less than the previously-calculated request complexity.

The access control management module 128 manages access within the cloud computing platform 102. For example, the access control management module 128 configures access to a logical view 132 by the cluster 118 assigned to the logical view 132 by the cluster management module 126. For instance, the access control management module 128 creates, edits, and removes user information 140 that defines permissions for accessing the requested data of a configuration request 130. For example, the access control management module 128 creates a user group (e.g. access control security group) within user information 140 for the one or more user accounts, jobs, applications, and/or client devices 108 identified within the configuration request 130.

Further, the access control management module 128 provides the members of the user group with one or more privileges for employing the cluster 118 to access the requested data within the temporary storage location 134 via the logical view 132, which retrieves the requested data from the data store 120 and stores the requested data within the temporary storage location 134. In addition, the privileges provided to the members of the user group are dynamically modified in response to updates to the user group. For example, upon removal of an account from a user group granted access to a particular view, the account automatically loses access to the particular view 132. As another example, upon addition of an account to a user group granted access to a particular view, the account automatically gains access to the particular view 132. Further, any changes to the view also cause updates to the data access privileges of the members of the user group.

In some aspects, once the management module 114 has provisioned access in response to the configuration request 130, the cloud computing platform 102 securely executes jobs over the requested data within the storage location 134 in response to requests 142 received from the client devices 108 associated with the accounts identified within the configuration request 130, and transmits responses 144 including the results of the jobs to the client devices 108. As used herein, in some aspects, a "job" refers to a plurality of computation units. Further, in some aspects, a job defines, schedules, monitors, and controls operations performed by a cluster 118.

Further, in some aspects, the management module 114 deprovisions access to previously-requested data. For example, in some aspects, the provisioned access expires based upon a predefined time period. In some other examples, the management module 114 receives a deprovisioning request from an administrator devices 106 to deprovisions access to previously-requested data. In response to a deprovisioning request 146, the cluster management module 126 unassigns the cluster 118, the data management module 124 deletes the storage location 134 and staging folder 136, and the access control management module 128 removes permissions assigned to the cluster 118 and the identities granted access to the cluster 118.

Example Processes

Figure 2:
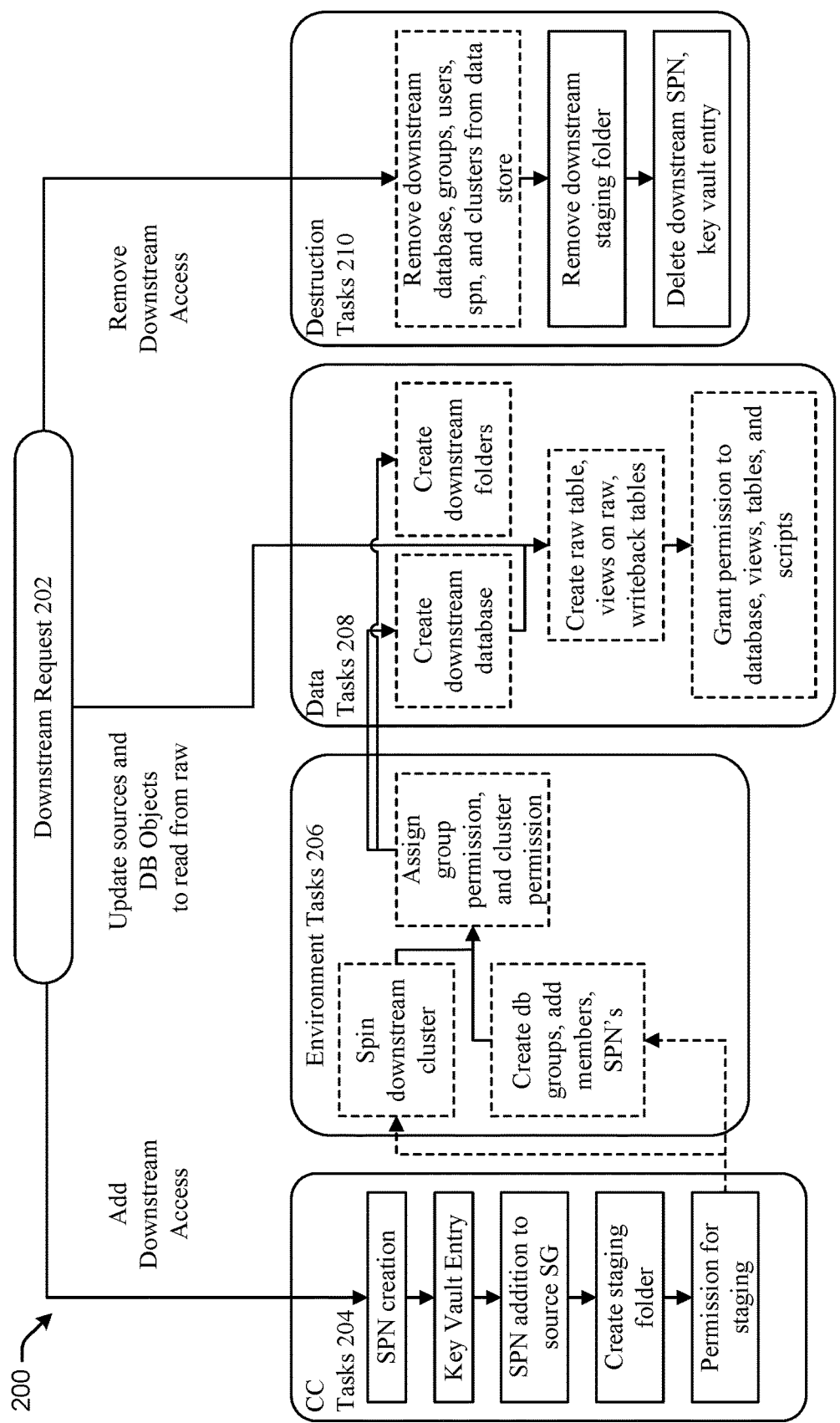
FIG. 2 is a flow diagram illustrating an example method for implementing downstream access with cell-level granularity within the cloud computing system, in accordance with some aspects of the present disclosure.

FIG. 2 illustrates is a flow diagram illustrating an example method for implementing downstream access with cell-level granularity within the cloud computing system, in accordance with some aspects of the present disclosure. As illustrated in FIG. 2, in some aspects, at step 202, the management module 114 receives a downstream request from an administrator device 104. If the request is for new downstream access, at step 204, the management module 114 performs the following cloud management tasks: create a service principal identifier (SPN) that is used to identify the one or more user accounts, applications, and/or client devices 108 identified within a configuration request 130 to receive the requested downstream access, create security information within a protected store (e.g., cryptographic keys, security policies, certificates, hardware secrets, and passwords within a key vault), add the service principal identifier to a security group, create a staging folder 136, and generate permissions for the scripts stored within the staging folder 136 to have the requested downstream access. Next, at step 206, the management module 114 performs the following cloud environment tasks: generate a cluster 118 for providing downstream access, create a data store group corresponding to the service principal, add one or more accounts to the data store group, and assign permissions to the data store group and cluster 118. Next, at step 208, the management module 114 performs the following data tasks: create a downstream database for the requested data, create a downstream folder (e.g., a storage location 134) for the requested data, create a raw table within the data store 120 for the source data 122 associated with the configuration request 130, create a logical view 132 corresponding to the requested data, create a writeback table for the requested data, and/or grant permission to the database, tables, and logical view 132.

If the request is for updating the source devices 104(1)-(*n*) and/or data store objects (e.g., tables, columns, filters) to read from the data store 120, at step 208, the management module 114 performs the following data management tasks: create a downstream database for the requested data, create downstream folders for the requested data, create a raw table within the data store 120, create a view corresponding to the requested data, create a writeback table for the requested data, grant permission to the database, tables, and logical view 132.

If the request is to remove downstream access, at step 210, the management module 114 performs the following deconstruction tasks: delete the downstream database, security group privileges, service principal identifier privileges, and cluster privileges, remove the staging folder 136, and delete the service principal identifier and security information. (e.g., key vault information)

The described processes in FIG. 3 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the cloud computing platform 102. By way of example and not limitation, the method 300 is described in the context of FIGS. 1, 2, and 4. For example, the operations may be performed by the services 110(1)-(*n*), the resources 112(1)-(*n*), the management module 114, the data management module 124, the cluster management module 126, the access control management module 128, the data module 116, and/or the clusters 118.

Figure 3:
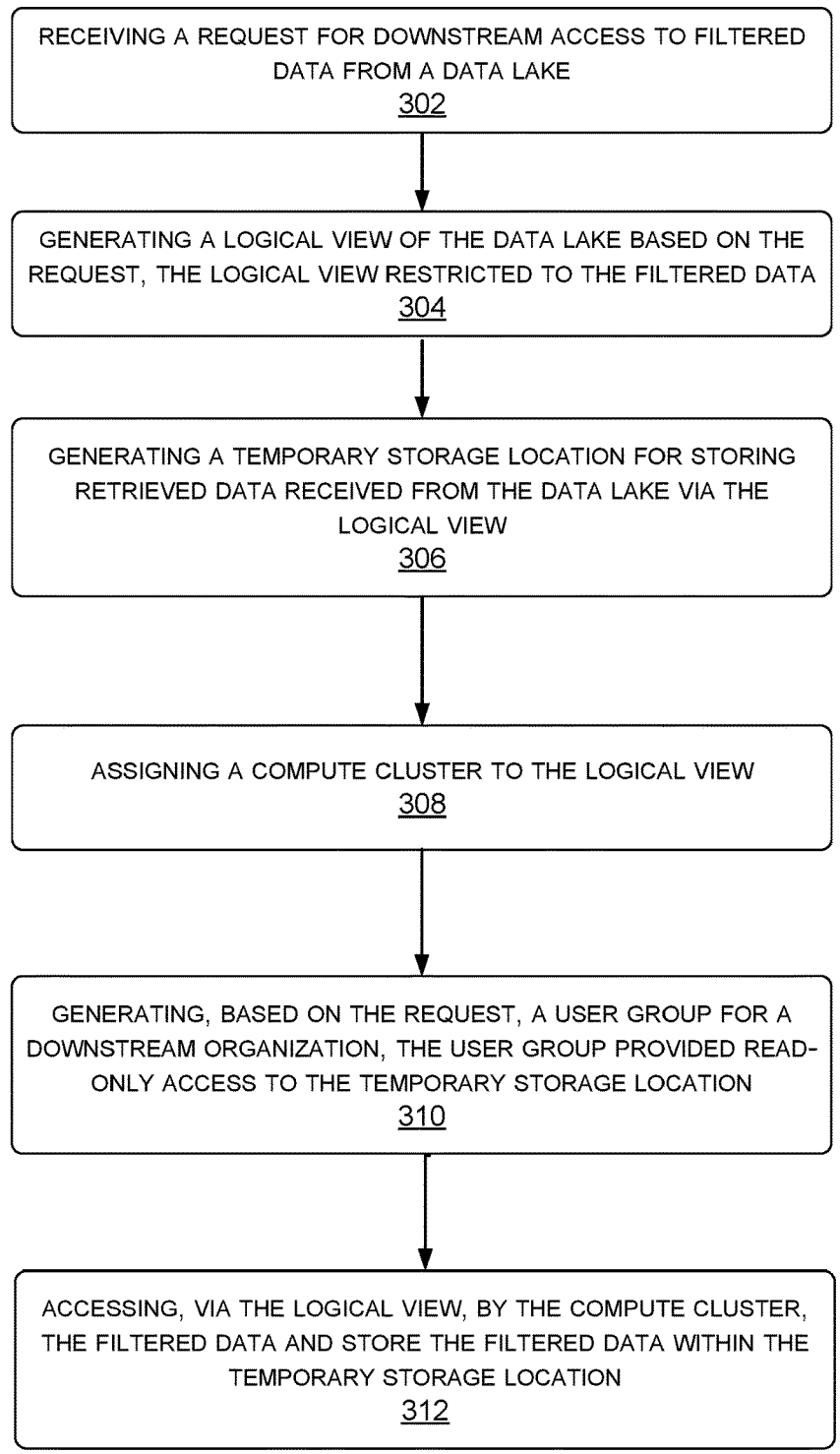
FIG. 3 is a flow diagram illustrating an example method 300 for provisioning downstream access to requested data within a data lake with cell-level granularity, in accordance with some aspects of the present disclosure.

FIG. 3 is a flow diagram illustrating an example method 300 for provisioning downstream access to requested data within a data lake with cell-level granularity, in accordance with some aspects of the present disclosure.

At block 302, the method 300 may include receiving a request for downstream access to filtered data from a data lake. For example, the management module 124 receives a configuration request 130 for providing one or more users access to a plurality cells of a plurality of tables of a data store 120 via an analytics application.

Accordingly, the cloud computing platform 102, the cloud computing device 400, and/or the processor 402 executing the management module 114 may provide means for receiving a request for downstream access to filtered data from a data lake.

At block 304, the method 300 may include generating a logical view to the data lake based on the request, the logical view restricted to the filtered data. For example, the management module 114 generates a logical view 132 for accessing the plurality of the cells of the plurality of tables. In some aspects, the logical view 132 is defined using a select statement that identifies particular attributes with a filter operation (e.g., a WHERE clause in SQL) in order provide cell-level security.

Accordingly, the cloud computing platform 102, the cloud computing device 400, the management module 114, and/or the processor 402 executing the data management module 124 may provide means for generating a logical view to the data lake based on the request, the logical view restricted to the filtered data.

At block 306, the method 300 may include generating a temporary storage location for storing retrieved data received from the data lake via the logical view. For example, the management module 114 generates a storage location 134 for storing data retrieved using the logical view 132.

Accordingly, the cloud computing platform 102, the cloud computing device 400, the management module 114, and/or the processor 402 executing the data management module 124 may provide means for generating a temporary storage location for storing retrieved data received from the data lake via the logical view.

At block 308, the method 300 may include assigning a compute cluster to the logical view. For example, the management module 114 generates a cluster 118 and assigns the cluster to the logical view 132. In some aspects, the type of cluster is determined based on the one or more entities identified within the configuration request 130. Further, in some instances, assigning the cluster 118 to the logical view 132 includes exclusively providing privileges for the cluster 118 to access the logical view 132, while otherwise denying the cluster 118 access to the data store 120 or any other logical views 132.

Accordingly, the cloud computing platform 102, the cloud computing device 400, the management module 114, and/or the processor 402 executing the cluster management module 126 may provide means for assigning a compute cluster to the logical view.

At block 310, the method 300 may include generating, based on the request, a user group for a downstream organization, the user group providing read-only access to the temporary storage location. For example, the management module 114 creates a security group for the one or more one or more users and analytics application Further, the security group is providing read-only access to the storage location 134 associated with the configuration request 130.

Accordingly, the cloud computing platform 102, the cloud computing device 400, the management module 114, and/or the processor 402 executing the access control management module may provide means for generating, based on the request, a user group for a downstream organization, the user group providing read-only access to the temporary storage location.

At block 312, the method 300 may include accessing, via the logical view, by the compute cluster, the filtered data and storing the filtered data within the temporary storage location. For example, in some aspects, the cluster 118 receives a request 142 to execute a job over the logical view 132, retrieves the data associated with the job via the logical view 132, and stores the data within the temporary storage location 134. Further, the cluster 118 executes the job and transmits a response 144 to the client device 108 including the results to the job.

Accordingly, the cloud computing platform 102, the cloud computing device 400, the management module 114, and/or the processor 402 executing cluster 118 may provide means for accessing, via the logical view, by the compute cluster, the filtered data and storing the filtered data within the temporary storage location.

In additional aspect, the method 300 includes receiving from an application associated with the user group, a request for the filtered data within the temporary storage location; and transmitting the filtered data to the application associated with the user group. Accordingly, the cloud computing platform 102, the cloud computing device 400, and/or the processor 402 executing the management module 114 may provide means for receiving, from an application associated with the user group, a request for the filtered data within the temporary storage location; and transmitting the filtered data to the application associated with the user group.

In additional aspect, the method 300 includes wherein generating the logical view for the data lake based on the request comprises generating the logical view to provide row-level access and column-level access to the data lake. Accordingly, the cloud computing platform 102, the cloud computing device 400, the management module 114, and/or the processor 402 executing the data management module 124 may provide means for generating the logical view to provide row-level access and column-level access to the data lake.

In additional aspect, the method 300 includes wherein assigning the compute cluster to the logical view, comprises limiting access and visibility of the compute cluster to the user group; and limiting data access to the logical view to the compute cluster. Accordingly, the cloud computing platform 102, the cloud computing device 400, the management module 114, and/or the processor 402 executing the data management module 124 and the cluster management module 126 may provide means for limiting access and visibility of the compute cluster to the user group; and limiting data access to the logical view to the compute cluster.

In additional aspect, the method 300 includes wherein assigning the compute cluster to the logical view, comprises determining a cluster type of the compute cluster based upon the request; and generating the compute cluster having the cluster type. Accordingly, the cloud computing platform 102, the cloud computing device 400, the management module 114, and/or the processor 402 executing the cluster management module 126 may provide means for determining a cluster type of the compute cluster based upon the request; and generating the compute cluster having the cluster type.

In additional aspect, the method 300 includes wherein assigning the compute cluster to the logical view, comprises determining one or more entities corresponding to the filtered data; calculating a complexity score based upon an entity size of each entity of the one or more entities; determining a cluster type of the compute cluster based upon complexity score; and generating the compute cluster having the cluster type. Accordingly, the cloud computing platform 102, the cloud computing device 400, the management module 114, and/or the processor 402 executing the cluster management module 126 may provide means for determining one or more entities corresponding to the filtered data; calculating a complexity score based upon an entity size of each entity of the one or more entities; determining a cluster type of the compute cluster based upon complexity score; and generating the compute cluster having the cluster type.

In additional aspect, the method 300 includes wherein the request is a first request, and further including: receiving a second request that modifies one or more entities identified within the first request; and resizing the compute cluster in response to second request. Accordingly, the cloud computing platform 102, the cloud computing device 400, the management module 114, and/or the processor 402 executing the cluster management module 126 may provide means for receiving a second request that modifies one or more entities identified within the first request; and resizing the compute cluster in response to second request.

In additional aspect, the method 300 includes deleting the logical view, user group, the compute cluster and temporary storage location based upon an expiration of the request. Accordingly, the cloud computing platform 102, the cloud computing device 400, and/or the processor 402 executing the management module 114 may provide means for deleting the logical view, user group, the compute cluster and temporary storage location based upon an expiration of the request.

In additional aspect, the method 300 includes wherein the data lake is a cloud-based centralized repository of structured and unstructured data. Accordingly, the cloud computing platform 102, the cloud computing device 400, and/or the processor 402 executing the management module 114 may provide means for wherein the data lake is a cloud-based centralized repository of structured and unstructured data.

While the operations are described as being implemented by one or more computing devices, in other examples various systems of computing devices may be employed. For instance, a system of multiple devices may be used to perform any of the operations noted above in conjunction with each other. For example, a car with an internal computing device along with a mobile computing device may be employed in conjunction to perform these operations.

Illustrative Computing Device

Figure 4:
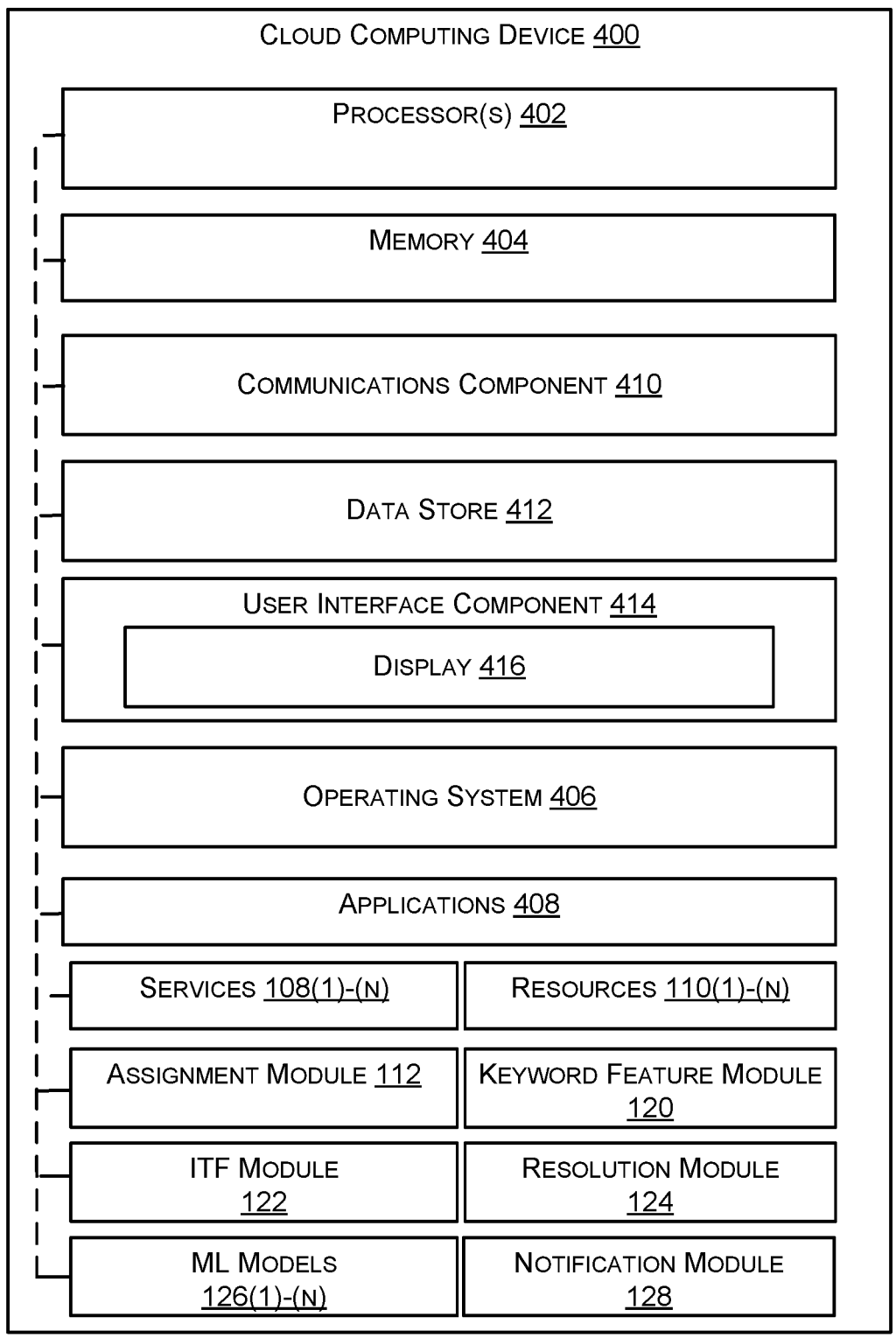
FIG. 4 is a block diagram illustrating an example of a hardware implementation for a cloud computing device, in accordance with some aspects of the present disclosure.

Referring now to FIG. 4, a cloud computing device 400 (e.g., cloud computing platform 102) in accordance with an implementation includes additional component details as compared to FIG. 1. In one example, the cloud computing device 400 includes the processor 402 for carrying out processing functions associated with one or more of components and functions described herein. The processor 402 can include a single or multiple set of processors or multi-core processors. Moreover, the processor 402 may be implemented as an integrated processing system and/or a distributed processing system. In an example, the processor 402 includes, but is not limited to, any processor specially programmed as described herein, including a controller, microcontroller, a central processing unit (CPU), a graphics processing unit (GPU), an application specific integrated circuit (ASIC), a field programmable gate array (FPGA), a system on chip (SoC), or other programmable logic or state machine. Further, the processor 402 includes other processing components such as one or more arithmetic logic units (ALUs), registers, or control units.

In an example, the cloud computing device 400 also includes the memory 404 for storing instructions executable by the processor 402 for carrying out the functions described herein. The memory 404 may be configured for storing data and/or computer-executable instructions defining and/or associated with the operating system 406, the services 110(1)-(n), the resources 112(1)-(n), the management module 114, the data management module 124, the cluster management module 126, the access control management module 128, the data module 116, the clusters 118, the data store 120, the source data 122, the logical views 132, the storage locations 134, the metadata 138, the user information 140 one or more applications 408, and the processor 402 may execute the operating system 406, the services 110(1)-(n), the resources 112(1)-(n), the management module 114, the data management module 124, the cluster management module 126, the access control management module 128, the data module 116, or the clusters 118, and/or the one or more applications 408. An example of memory 404 includes, but is not limited to, a type of memory usable by a computer, such as random access memory (RAM), read only memory (ROM), tapes, magnetic discs, optical discs, volatile memory, non-volatile memory, and any combination thereof. In an example, the memory 404 may store local versions of applications being executed by processor 402.

The example cloud computing device 400 also includes a communications component 410 that provides for establishing and maintaining communications with one or more parties utilizing hardware, software, and services as described herein. The communications component 410 may carry communications between components on the cloud computing device 400, as well as between the cloud computing device 400 and external devices, such as devices located across a communications network and/or devices serially or locally connected to the cloud computing device 400. For example, the communications component 410 includes one or more buses, and may further include transmit chain components and receive chain components associated with a transmitter and receiver, respectively, operable for interfacing with external devices. In an implementation, for example, the communications component 410 includes a connection to communicatively couple the source devices 104(1)-(n), the administrator devices 106(1)-(n), and the client devices 108(1)-(N) to the processor 402.

The example cloud computing device 400 also includes a data store 412, which may be any suitable combination of hardware and/or software, that provides for mass storage of information, databases, and programs employed in connection with implementations described herein. For example, the data store 412 may be a data repository for the operating system 406 and/or the applications 408.

The example cloud computing device 400 also includes a user interface component 414 operable to receive inputs from a user of the cloud computing device 400 and further operable to generate outputs for presentation to the user. The user interface component 414 includes one or more input devices, including but not limited to a keyboard, a number pad, a mouse, a touch-sensitive display (e.g., display 416), a digitizer, a navigation key, a function key, a microphone, a voice recognition component, any other mechanism capable of receiving an input from a user, or any combination thereof. Further, the user interface component 414 includes one or more output devices, including but not limited to a display (e.g., display 416), a speaker, a haptic feedback mechanism, a printer, any other mechanism capable of presenting an output to a user, or any combination thereof.

In an implementation, the user interface component 414 may transmit and/or receive messages corresponding to the operation of the operating system 406 and/or the applications 408. In addition, the processor 402 executes the operating system 406 and/or the applications 408, and the memory 404 or the data store 412 may store them.

Further, one or more of the subcomponents of the services 110(1)-(n), the management module 114, the data management module 124, the cluster management module 126, the access control management module 128, the data module 116, and/or the clusters 118, may be implemented in one or more of the processor 402, the applications 408, the operating system 406, and/or the user interface component 414 such that the subcomponents of the services 110(1)-(n), the management module 114, the data management module 124, the cluster management module 126, the access control management module 128, the data module 116, and/or the clusters 118, are spread out between the components/subcomponents of the cloud computing device 400.

Conclusion

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A device comprising:
a memory storing instructions; and
at least one processor coupled with the memory and configured to execute the instructions to:
receive a request for downstream access to filtered data from a data lake;
generate a logical view to the data lake based on the request, the logical view restricted to the filtered data;
generate a temporary storage location for storing retrieved data received from the data lake via the logical view;
assign a compute cluster to the logical view;
generate, based on the request, a user group for a downstream organization, the user group providing read-only access to the temporary storage location; and
access, via the logical view, by the compute cluster, the filtered data and store the filtered data within the temporary storage location.

2. The device of claim 1, wherein the at least one processor is configured to:
receive, from an application associated with the user group, a request for the filtered data within the temporary storage location; and
transmit the filtered data to the application associated with the user group.

3. The device of claim 1, wherein to generate the logical view for the data lake based on the request, the at least one processor coupled with the memory and configured to execute the instructions to:
generate the logical view to provide row-level access and column-level access to the data lake.

4. The device of claim 1, wherein to assign the compute cluster to the logical view, the at least one processor coupled with the memory and configured to execute the instructions to:
limit access and visibility of the compute cluster to the user group; and
limit data access to the logical view to the compute cluster.

5. The device of claim 1, wherein to assign the compute cluster to the logical view, the at least one processor coupled with the memory and configured to execute the instructions to:
determine a cluster type of the compute cluster based upon the request; and generate the compute cluster having the cluster type.

6. The device of claim 1, wherein to assign the compute cluster to the logical view, the at least one processor coupled with the memory and configured to execute the instructions to:
determine one or more entities corresponding to the filtered data;
calculate a complexity score based upon an entity size of each entity of the one or more entities;
determine a cluster type of the compute cluster based upon complexity score; and
generate the compute cluster having the cluster type.

7. The device of claim 1, wherein the request is a first request, and the at least one processor coupled with the memory and configured to execute the instructions to:
receive a second request that modifies one or more entities identified within the first request; and
resize the compute cluster in response to the second request.

8. The device of claim 1, wherein the at least one processor coupled with the memory and configured to execute the instructions to:
delete the logical view, user group, the compute cluster and temporary storage location based upon an expiration of the request.

9. A method comprising:
receiving a request for downstream access to filtered data from a data lake;
generating a logical view to the data lake based on the request, the logical view restricted to the filtered data;
generating a temporary storage location for storing retrieved data received from the data lake via the logical view;
assigning a compute cluster to the logical view;
generating, based on the request, a user group for a downstream organization, the user group providing read-only access to the temporary storage location; and
accessing, via the logical view, by the compute cluster, the filtered data and storing the filtered data within the temporary storage location.

10. The method of claim 9, further comprising:
receiving, from an application associated with the user group, a request for the filtered data within the temporary storage location; and
transmitting the filtered data to the application associated with the user group.

11. The method of claim 9, wherein generating the logical view for the data lake based on the request, comprises:
generating the logical view to provide row-level access and column-level access to the data lake.

12. The method of claim 9, wherein assigning the compute cluster to the logical view, comprises:
limiting access and visibility of the compute cluster to the user group; and
limiting data access to the logical view to the compute cluster.

13. The method of claim 9, wherein assigning the compute cluster to the logical view, comprises:
determining a cluster type of the compute cluster based upon the request; and
generating the compute cluster having the cluster type.

14. The method of claim 9, wherein assigning the compute cluster to the logical view, comprises:
determining one or more entities corresponding to the filtered data;
calculating a complexity score based upon an entity size of each entity of the one or more entities;
determining a cluster type of the compute cluster based upon complexity score; and
generating the compute cluster having the cluster type.

15. The method of claim 9, wherein the request is a first request, and further comprising:
receiving a second request that modifies one or more entities identified within the first request; and
resizing the compute cluster in response to second request.

16. The method of claim 15, further comprising:
deleting the logical view, user group, the compute cluster and temporary storage location based upon an expiration of the request.

17. A non-transitory computer-readable device having instructions thereon that, when executed by at least one computing device, causes the at least one computing device to perform operations comprising:
receiving a request for downstream access to filtered data from a data lake;
generating a logical view to the data lake based on the request, the logical view restricted to the filtered data;
generating a temporary storage location for storing retrieved data received from the data lake via the logical view;
assigning a compute cluster to the logical view;
generating, based on the request, a user group for a downstream organization, the user group providing read-only access to the temporary storage location; and
accessing, via the logical view, by the compute cluster, the filtered data and storing the filtered data within the temporary storage location.

18. The non-transitory computer-readable device of claim 17, wherein the operations further comprise:
receiving, from an application associated with the user group, a request for the filtered data within the temporary storage location; and
transmitting the filtered data to the application associated with the user group.

19. The non-transitory computer-readable device of claim 17, wherein generating the logical view for the data lake based on the request, comprises:
generating the logical view to provide row-level access and column-level access to the data lake.

20. The non-transitory computer-readable device of claim 17, wherein assigning the compute cluster to the logical view, comprises:
determining one or more entities corresponding to the filtered data;
calculating a complexity score based upon an entity size of each entity of the one or more entities;
determining a cluster type of the compute cluster based upon complexity score; and
generating the compute cluster having the cluster type.

* * * * *